United States Patent
Mattson et al.

(10) Patent No.: US 8,600,624 B2
(45) Date of Patent: Dec. 3, 2013

(54) METHOD OF MATCHING COMPONENT FOR VEHICLE HEAD RESTRAINT ACTUATION SYSTEM

(75) Inventors: Keith E. Mattson, Livonia, MI (US); David A. Hein, Sterling Heights, MI (US); Arjun V. Yetukuri, Rochester Hills, MI (US); Kimberly Dawn Krulek, Byron Center, MI (US); Sai Prasad Jammalamadaka, Novi, MI (US)

(73) Assignee: Lear Corporation, Southfield, MI (US)

( * ) Notice: Subject to any disclaimer, the term of this patent is extended or adjusted under 35 U.S.C. 154(b) by 1382 days.

(21) Appl. No.: 12/058,703

(22) Filed: Mar. 29, 2008

(65) Prior Publication Data

US 2009/0248255 A1 Oct. 1, 2009

(51) Int. Cl.
*B60R 22/00* (2006.01)

(52) U.S. Cl.
USPC .......................................................... 701/49

(58) Field of Classification Search
None
See application file for complete search history.

(56) References Cited

U.S. PATENT DOCUMENTS

| | | | |
|---|---|---|---|
| 2,985,229 A | 5/1961 | Shamblin | |
| 4,645,233 A | 2/1987 | Bruse et al. | |
| 4,711,494 A | 12/1987 | Duvenkamp | |
| 4,807,034 A | 2/1989 | Takeuchi et al. | |
| 4,977,973 A | 12/1990 | Takizawa | |
| 5,003,240 A | 3/1991 | Ikeda | |
| 5,006,771 A | 4/1991 | Ogasawara | |
| 5,208,514 A | 5/1993 | Bassick | |
| 5,288,129 A | 2/1994 | Nemoto | |
| 5,322,245 A | 6/1994 | Bassick | |
| 5,484,189 A | 1/1996 | Patterson | |
| 5,590,933 A | 1/1997 | Andersson | |
| 5,594,222 A * | 1/1997 | Caldwell | 200/600 |
| 5,822,707 A * | 10/1998 | Breed et al. | 701/49 |
| 6,001,486 A * | 12/1999 | Varaprasad et al. | 428/428 |
| 6,074,011 A | 6/2000 | Ptak et al. | |
| 6,088,640 A | 7/2000 | Breed | |
| 6,310,611 B1 * | 10/2001 | Caldwell | 345/173 |
| 6,320,282 B1 * | 11/2001 | Caldwell | 307/125 |
| 6,614,579 B2 | 9/2003 | Roberts et al. | |
| 6,627,918 B2 * | 9/2003 | Getz et al. | 257/59 |
| 6,629,575 B2 | 10/2003 | Nikolov | |

(Continued)

FOREIGN PATENT DOCUMENTS

DE 3440525 A1 5/1986
DE 3638261 A1 6/1987

(Continued)

OTHER PUBLICATIONS

English Abstract corresponding to DE 3440525.

(Continued)

*Primary Examiner* — Thomas Tarcza
*Assistant Examiner* — Adam Alharbi
(74) *Attorney, Agent, or Firm* — Brooks Kushman P.C.

(57) ABSTRACT

A remote rearview mirror system for actuating a vehicle head restraint includes a transmitting module and receiving module that operate at a distance. The transmitting module is included in a rear view mirror. These modules require a matching that need to be preserved until the components are installed in a vehicle. The steps of such matching include the incorporation of the transmitting module into a mirror-transmitting module combination that is associated with its respective receiving module.

9 Claims, 10 Drawing Sheets

(56) References Cited

U.S. PATENT DOCUMENTS

| | | | |
|---|---|---|---|
| 6,690,268 B2* | 2/2004 | Schofield et al. | 340/438 |
| 6,824,212 B2 | 11/2004 | Malsch et al. | |
| 6,902,232 B2 | 6/2005 | Kamrath et al. | |
| 6,908,151 B2 | 6/2005 | Meeker et al. | |
| 6,910,740 B2 | 6/2005 | Baker et al. | |
| 7,048,337 B2* | 5/2006 | Steinle et al. | 297/409 |
| 7,172,254 B2* | 2/2007 | Steinle et al. | 297/409 |
| 7,196,836 B2 | 3/2007 | Bauer et al. | |
| 7,232,187 B1 | 6/2007 | Sundararajan et al. | |
| 7,556,306 B2* | 7/2009 | Yetukuri et al. | 296/63 |
| 2002/0147535 A1 | 10/2002 | Nikolov | |
| 2004/0124677 A1 | 7/2004 | Meeker et al. | |
| 2004/0189068 A1 | 9/2004 | Meeker et al. | |
| 2005/0006575 A1* | 1/2005 | Heslin et al. | 250/239 |
| 2005/0067874 A1 | 3/2005 | Kamrath et al. | |
| 2005/0270620 A1 | 12/2005 | Bauer et al. | |
| 2007/0114810 A1* | 5/2007 | Yetukuri et al. | 296/65.01 |
| 2007/0114822 A1* | 5/2007 | Yetukuri et al. | 297/217.3 |
| 2008/0019007 A1* | 1/2008 | Kulas et al. | 359/604 |

FOREIGN PATENT DOCUMENTS

| | | |
|---|---|---|
| DE | 4433601 C1 | 4/1996 |
| DE | 198 10 347 A1 | 9/1998 |
| EP | 0 688 695 A1 | 12/1995 |
| EP | 0 756 964 A2 | 2/1997 |
| EP | 1 138 548 A1 | 10/2001 |
| GB | 2 424 827 A | 10/2006 |
| WO | 01/38135 A1 | 5/2001 |
| WO | 2005/075241 A1 | 8/2005 |

OTHER PUBLICATIONS

English Abstract corresponding to DE 3638262.
English Abstract corresponding to DE 4433601.
English Abstract corresponding to DE 198 10 347.
English Abstract corresponding to EP 0 756 964.
English Abstract corresponding to EP 0 688 695.
Search Report, dated Mar. 16, 2007, 2 pages.

* cited by examiner

METHOD OF MATCHING COMPONENT FOR VEHICLE HEAD RESTRAINT ACTUATION SYSTEM

BACKGROUND OF THE INVENTION

1. Field of the Invention

The present invention is related to the logistics and methodology in providing vehicle head restraint actuator for inclusion in a vehicle interior.

2. Background Art

Advanced vehicle systems are constantly being developed by automobile manufactures in order to address customer desires and potentially provide a competitive advantage. Many such vehicle systems address aesthetic aspects of a vehicle appearance or methods of operation.

U.S. Pat. Appl. No. 20070114810 provides a system of remotely operating a head restraint in a vehicle. In the system of this application, a forwardly positioned vehicle occupant (i.e., the driver) is able to remotely operate a head restraint located in a rearward position. This functionality is provided by viewing the target head restraint in a rearview mirror and then positioning an object (e.g., a finger) proximate to the reflective image of the head restraint desired to be operated. A transmitter in the mirror assembly sends a signal to a receiver associated with the head restraint which in turn causes an actuator to move the head restraint. The system of the '810 application requires that the transmitter and receiver modules be matched in a unique manner. This matching is particularly important when RF signals are utilized so that neighboring vehicles are not inadvertently affected. Methods of maintaining the association of the matched transmitters and receivers throughout the vehicle assembly process are desirable.

Accordingly, there exists a need for methods of matching the transmitter modules with receiver modules in remotely activated head restraint actuation systems.

SUMMARY OF THE INVENTION

Against this prior art background, the present invention relates to a method of matching components in a head restraint actuation system. The head restraint actuation system to which the method is applicable is described in U.S. Pat. Appl. No. 20070114810. The remote head restraint actuation system includes at least one first head restraint and an actuator configured to effect movement of the head restraint from its raised position to its lowered position. The system also includes a rearview mirror and a sensor defining an area proximate to the rearview mirror. The sensor is configured to output signals to the actuator to facilitate movement of the head restraint from its raised position to its lowered position when an object comes within a predetermined distance of the area. Characteristically, the sensor is disposed proximate to the mirror such that a vehicle operator can simultaneously view the head restraint in the mirror and the area. The system also includes a transmitting module in communication with the sensor and a receiving module in communication with the actuator. The transmitting and receiving module because of their ability to function remotely require proper matching for correct operation.

The method of the present embodiment provides the requisite matching of components. The method includes a step of programming the receiving module to recognize signals from the transmitting module. Typically, the transmitter has a unique ID that is recognized by the receiving module after programming. The receiving module is thus associated with the transmitting module. The transmitting module and the associated receiving module are eventually forwarded to a mirror assembly plant that assembles mirror systems. The mirror assembly plant incorporates the transmitting module into a mirror-transmitter combination. The mirror-transmitter combination and an associated receiving module are then forwarded to an assembly plant that installs the mirror-transmitter combination in a vehicle.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 1:
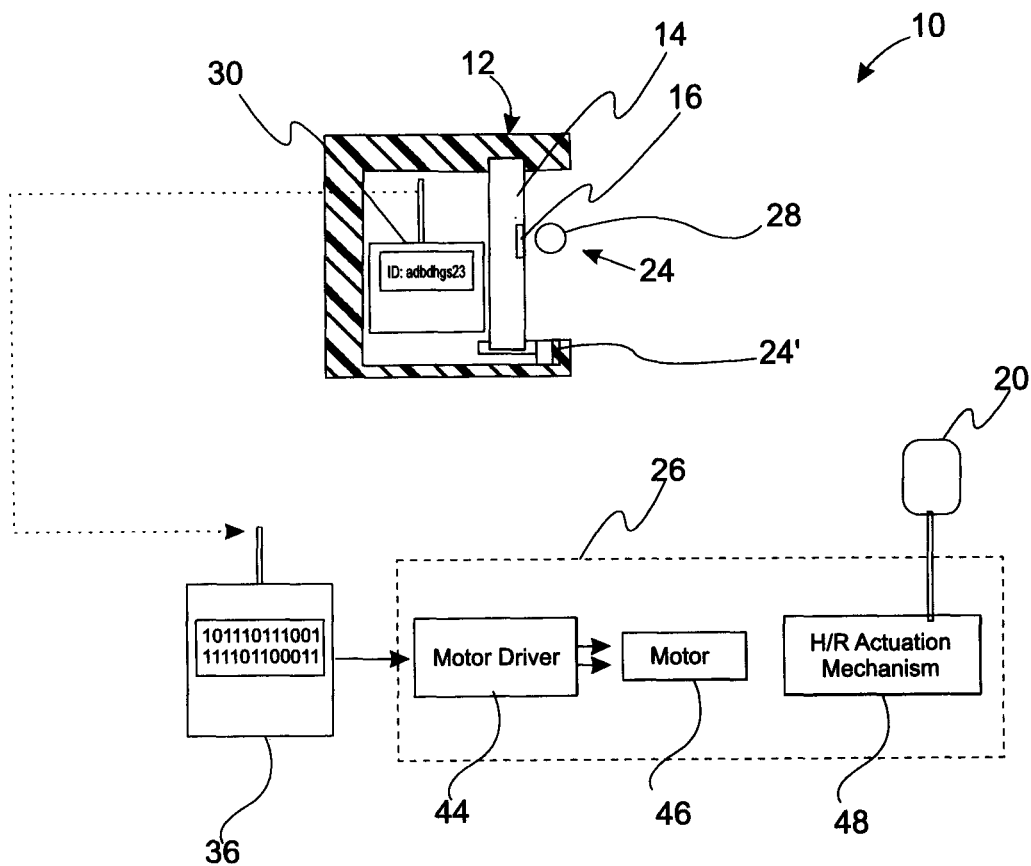
FIG. 1 is a schematic illustration of a remote head restraint actuation system assembled by an embodiment of the invention.
Figure 2:
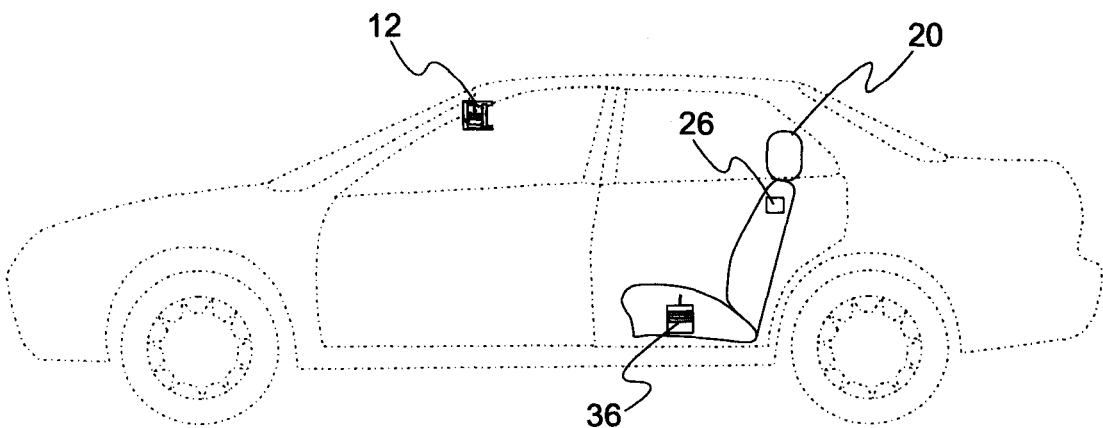
FIG. 2 is a schematic illustration of the remote head restraint actuation system of FIG. 1 installed in a vehicle.

In an embodiment of the present invention, a method of matching components in a system for remote actuation of a head restraint is provided. With reference to FIGS. 1 and 2, schematic illustrations of the head restraint actuation system are provided. Head restraint actuation system 10 comprises rear view mirror assembly 12 which includes mirror 14 and sensor 16. Head restraint actuation system 10 also includes head restraint 20. Actuator system 26 is configured to effect movement of the head restraint 20 from a raised position to a lowered position. Sensor 16 defines sensor area 24 and configured to output signals to actuator system 26 to facilitate movement of the head restraint 20 from the raised position to the lowered position and visa versa if desired. This movement is initiated when object 28 comes within a predetermined distance of sensor area 24 or contacts mirror 14 in the vicinity of sensor 16. Sensor area 24 is disposed proximate to mirror 14 such that a vehicle operator can simultaneously view head restraint 20 in mirror 14 and sensor area 24. Transmitting module 30 is in communication with sensor 16 and 36 while receiving module 36 is in communication with actuator system 26 and 30. Typically, an RF signal is utilized to establish such communication. Details of head restraint systems that are useful in the present invention are provided in U.S. Patent Publication 20070114810. The entire disclosure of this application is hereby incorporated by reference.

Still referring to FIGS. 1 and 2, receiving module 36 upon receiving a signal from transmitting module 30 induces actuation system 26 to move head restraint 20 as set forth above. The details of useful actuation systems are provided in U.S. Patent Publication 20070114810. In the specific system depicted in FIG. 1, actuation system 26 includes motor driver 44, motor 46, and actuation mechanism 48.

In should be appreciated that head restraint actuation system 10 may be used to independently operate a plurality of head restraints. In such a variation, there will be a plurality of sensors 16 each of which defines a corresponding sensor area 24 that is associated with a predetermined head restraint. In this variation there will also be a plurality of transmitting modules 30 each of which is paired with one or more receiving modules. Each transmitting module-receiving module pair is associated with a specific head restraint to be operated.

Figure 3:
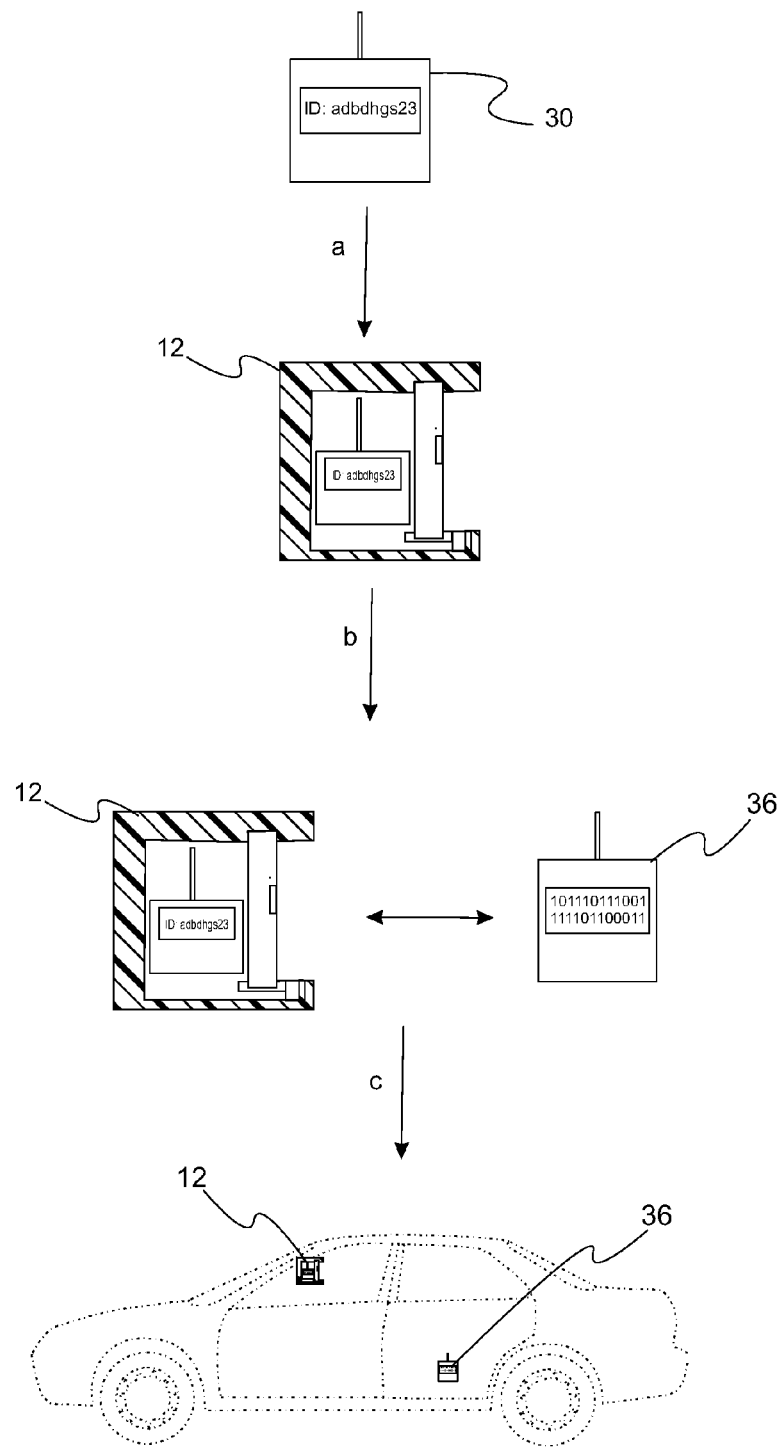
FIG. 3 provides a pictorial flowchart illustrating the matching of components of the remote head restraint actuation system of FIG. 1.

With reference to FIG. 3, a pictorial flowchart providing a sequence of steps for incorporating a head restraint actuation system in a vehicle is provided. Transmitting module 30 is installed in rearview mirror assembly 12. In step b) transmitting module 30 is associated with receiving module 36. In step c), the rearview mirror assembly 12 is installed and receiving module 36 are installed in vehicle.

Figure 4A:
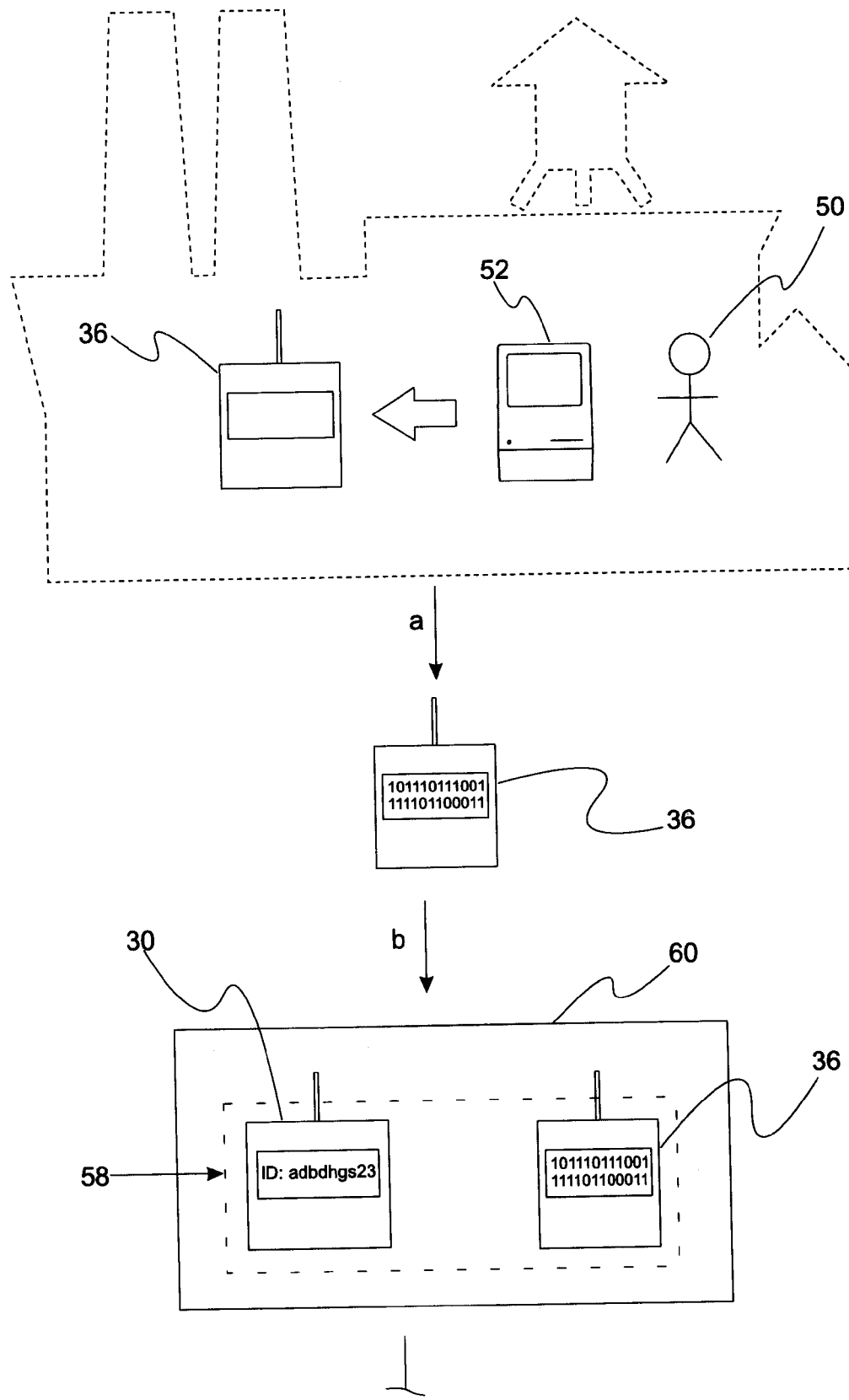
FIGS. 4A and 4B provide a pictorial flowchart showing the placement of the remote actuation system of FIG. 1 in a vehicle.
Figure 4B:
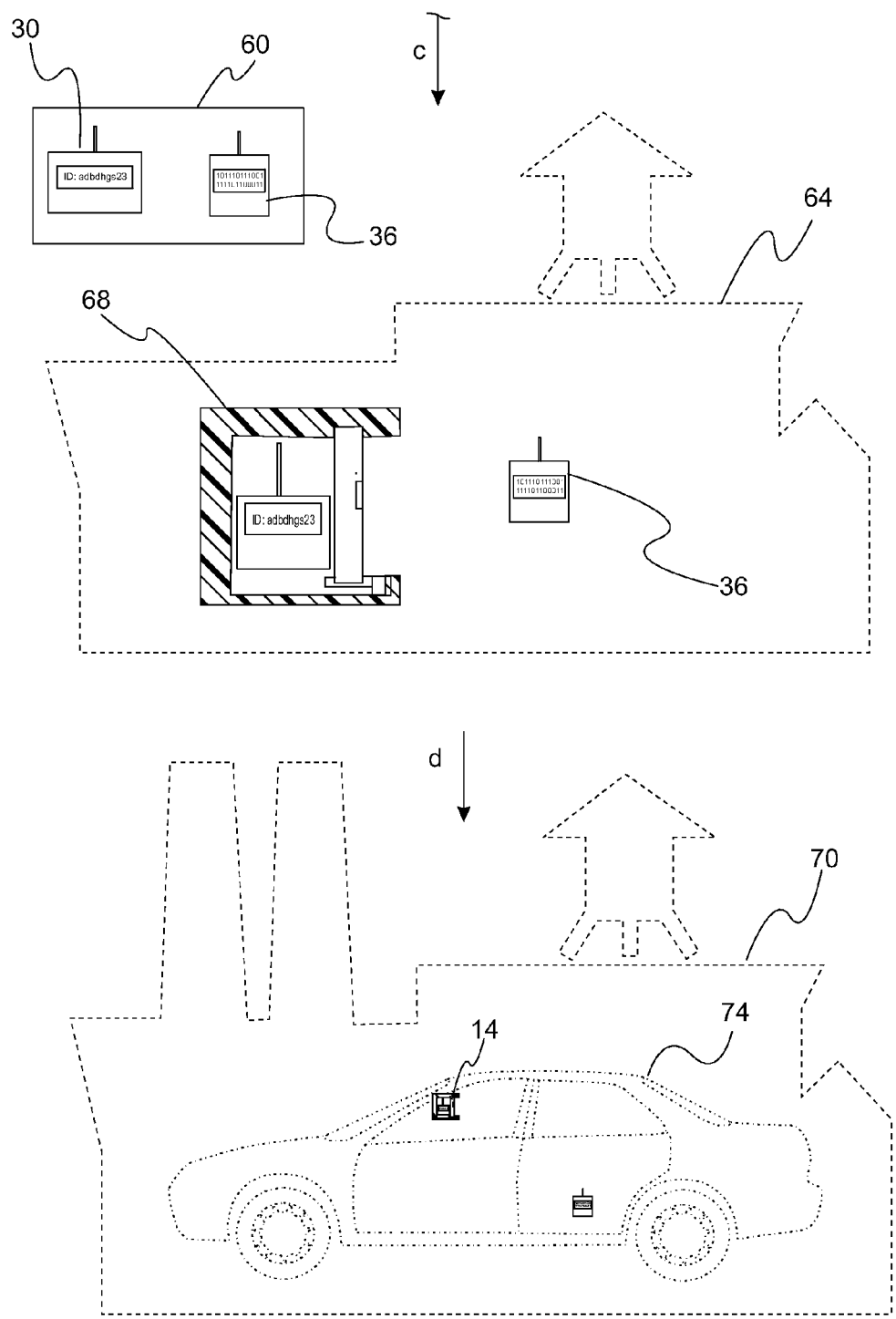

With reference to FIGS. 4A-B, a pictorial flowchart illustrating the operation of head restraint actuation system 10 is provided. The method of this embodiment comprises programming receiving module 36 in step a) to recognize signals from transmitting module 30. In a variation, receiving module 36 is programed by user 50 utilizing digital programming system 52. Transmitter 30 has a unique ID that is recognized by receiving module 36 after programming. When a plurality of transmitting modules are utilized, each transmitting module is individually and uniquely programmed.

Still referring to FIGS. 4A-B, in step b), receiving module 36 is associated with transmitting module 30 to form transmitter-receiver pair 58. When a plurality of transmitting modules are utilized, a plurality of such transmitter-receiver pairs are constructed. In one variation, receiving module 36 is associated with transmitting module 30 by attaching the receiving module to the transmitting module. In a further refinement, transmitter-receiver pair(s) are packaged together for transport in package 60. In another variation, receiving module 36 is associated with transmitting module 30 by coding the receiving module and the transmitting module with a unique identification code.

In step c, transmitting module 30 along with its associated receiving module 36 are forwarded to mirror assembly plant 64 that assembles mirror systems. Mirror assembly plant 64 incorporates transmitting module 30 into mirror-transmitter combination 68. In a variation of the present embodiment, the mirror-transmitter combination is formed by establishing communication between mirror 14 and transmitting module 30. Mirror-transmitter combination 68 is forwarded to vehicle assembly plant 70 which installs mirror-transmitter combination 68 in vehicle 74. When more than one head restraint are to be remotely actuated, multiple transmitter modules are incorporated into the mirror-transmitter combination.

Figure 5:
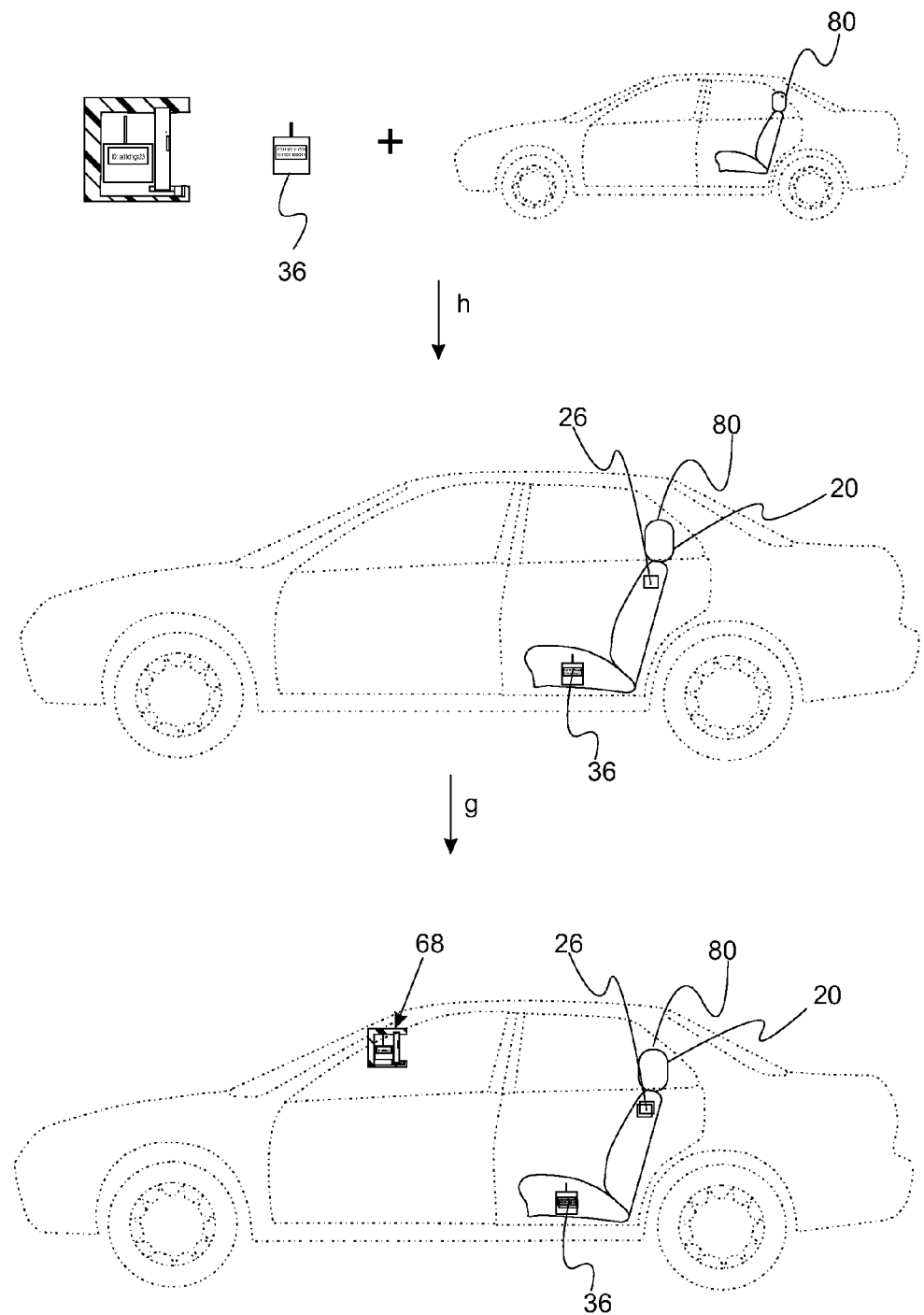
FIG. 5 is a pictorial flowchart showing the incorporation of a head restraint actuation system.

With reference to FIG. 5, a pictorial flowchart showing the incorporation of a head restraint actuation system in a vehicle is provided. In step h, receiver module 36 is installed in vehicle seat 80. Mirror-transmitter combination 68 is then installed in vehicle seat 80 is step h. Finally, the mirror transmitter combination is aligned so that head restraint 20 appears at the proper location in rear view mirror 14. It should be appreciated that the order of step in the present variation is not critical. As set forth below, these steps may be performed in various orders at different or the same manufacturing facilities.

Figure 6:
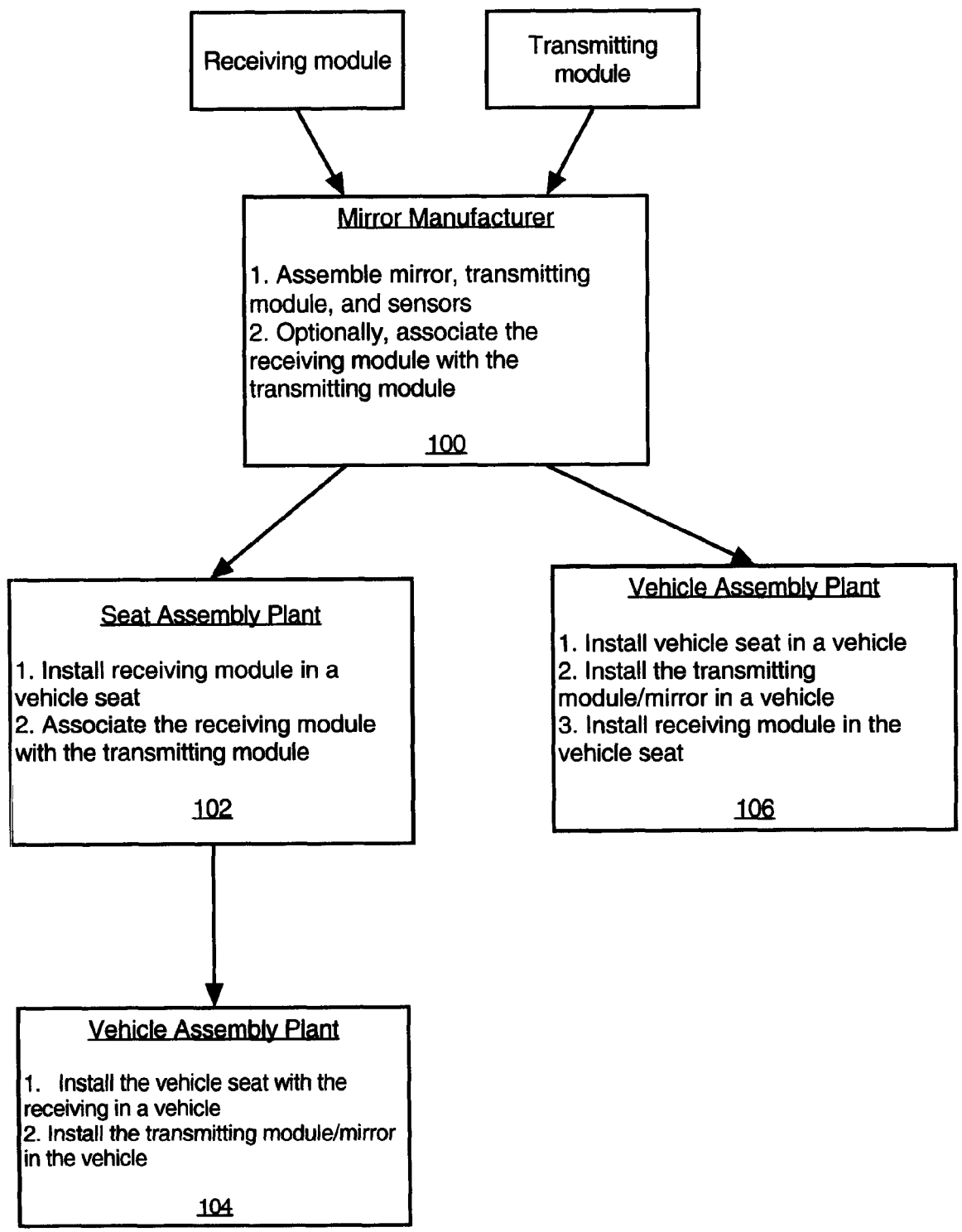
FIG. 6 provides a flowchart of a variation for assembling a remote head restraint actuation system in a vehicle.

With reference to FIGS. 6-10, additional variations of the present invention are illustrated. FIG. 6 provides a flowchart in which a receiving module and a transmitting module are forwarded to a mirror manufacturer (or a first assembly station) as shown by box 100. The mirror manufacturer installs the transmitting module in a mirror assembly to form a transmitting module/mirror assembly. Optionally, the receiving module is uniquely associated with the transmitting module. In a first refinement, a vehicle seat assembly plant (or a second assembly station) installs a receiving module in a vehicle seat and if necessary associates the receiving module with the transmitting module (Box 102). The term "associating" as used herein means programming or matching a transmitter to a receiver. The vehicle seat and the transmitting module/mirror assembly are forwarded to a vehicle assembly plant (or a third assembly station). The vehicle assembly plant installs the transmitting module/mirror assembly and the vehicle seat in a vehicle (Box 104). In a second refinement, the transmitting module/mirror assembly are forwarded to a vehicle assembly plant (or a second assembly station) that installs a transmitting module/mirror assembly and a vehicle seat in a vehicle. The receiving module is also installed in a vehicle seat at the vehicle assembly plant.

Figure 7:
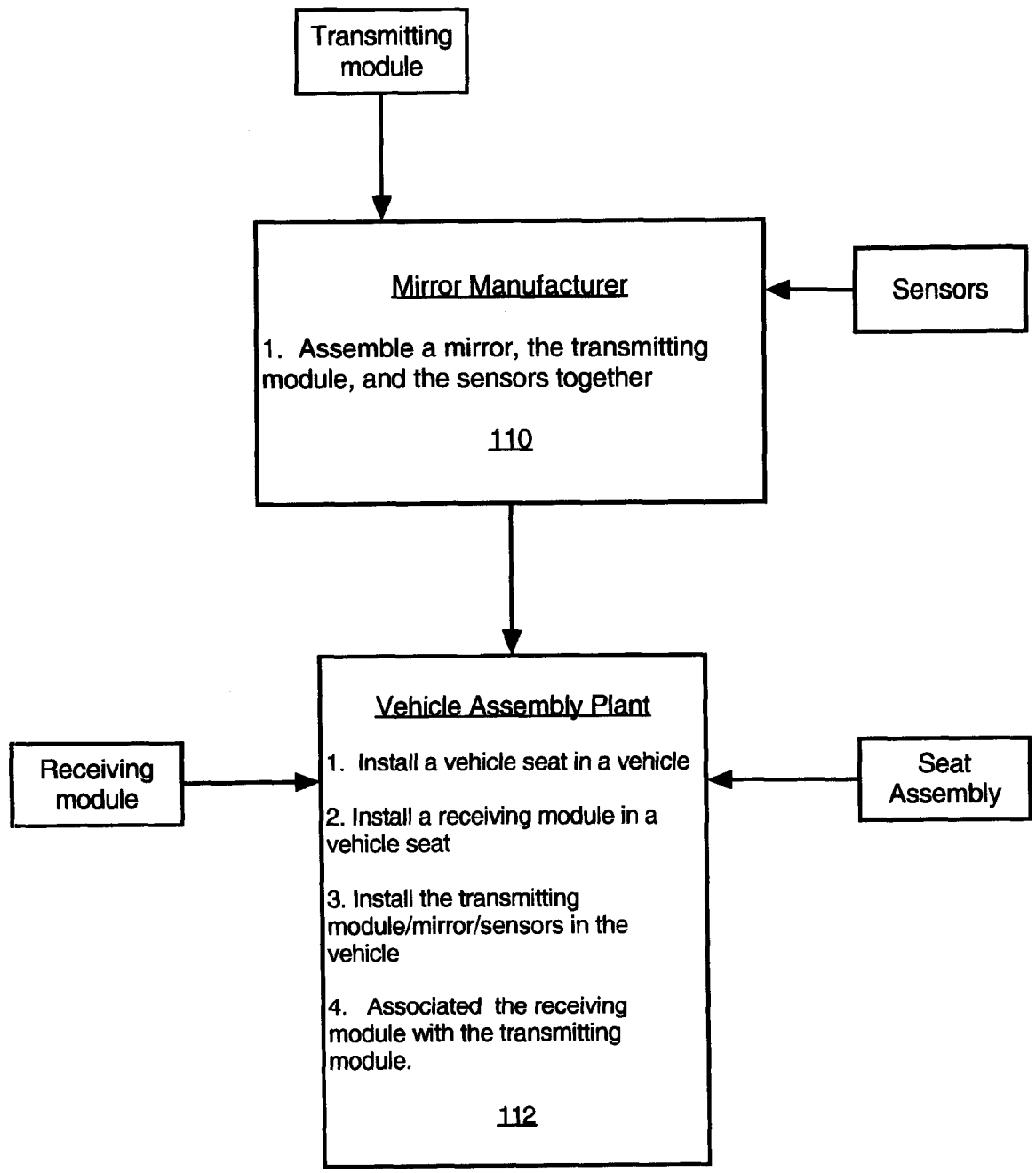
FIG. 7 provides a flowchart of another variation for assembling a remote head restraint actuation system in a vehicle.

FIG. 7 provides a flowchart depicting another variation for installing a remote actuation head restraint system in a vehicle. A transmitting module and sensors are forwarded to a mirror manufacturer (or a first assembly station). The mirror, transmitting module, and sensors are assembled together to form a mirror/transmitting module/sensor assembly (Box 110). The mirror/transmitting module/sensor assembly is forward to a vehicle assembly plant (or a second assembly station). At the vehicle assembly plant, a vehicle seat is installed in a vehicle. A receiving module and the mirror/transmitting module/sensor assembly are installed in the vehicle seat. Finally, the receiving module is associated with the transmitting module (Box 112).

Figure 8:
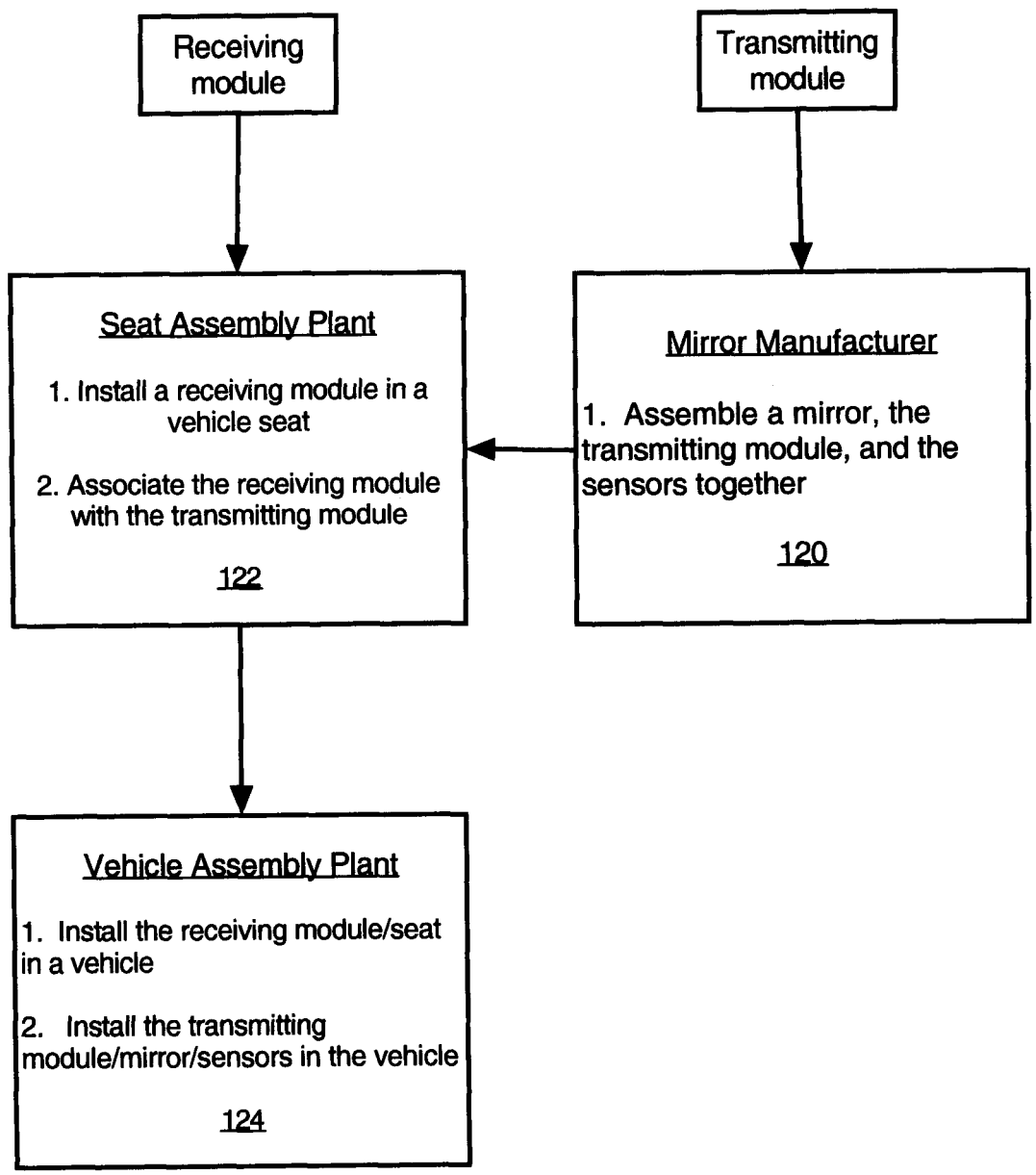
FIG. 8 provides a flowchart of another variation for assembling a remote head restraint actuation system in a vehicle.

FIG. 8 provides a flowchart depicting another variation for installing a remote actuation head restraint system in a vehicle. A transmitting module is forwarded to a mirror manufacturer (or a second assembly station) where the transmitting module is assembled with a mirror to form a transmitting module/mirror assembly as set forth in box 120. The transmitting module/mirror assembly and a receiving module are forwarded to a seat assembly plant (or a second assembly station) at which the receiving module is installed in a vehicle seat. The receiving module is also associated with the transmitting module at the seat assembly plant (box 122). The transmitting module/mirror assembly and the vehicle seat are forward to a vehicle assembly plant (or a third assembly station). At the vehicle assembly plant, the vehicle seat and the transmitting module/mirror assembly are installed in a vehicle (box 124).

Figure 9:
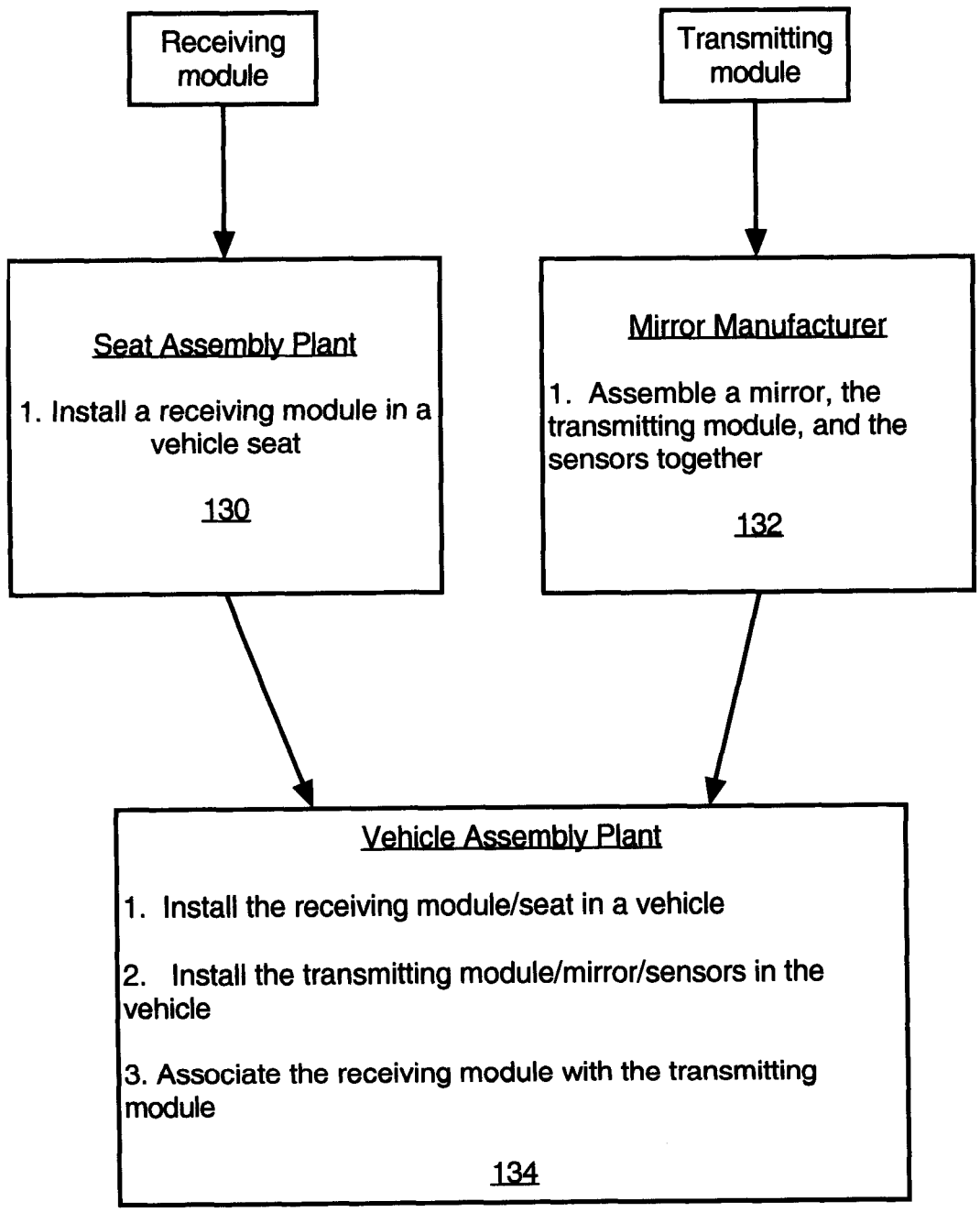
FIG. 9 provides a flowchart of another variation for assembling a remote head restraint actuation system in a vehicle.

FIG. 9 provides a flowchart depicting another variation for installing a remote actuation head restraint system in a vehicle. A receiving module is forwarded to a seat assembly plant (or a first assembly station) at which the receiving module is installed in a vehicle seat (box 130). A transmitting module is forwarded to a mirror manufacturer (or a second assembly plant) where the transmitting module is assembled with a mirror to form a transmitting module/mirror assembly (box 132). A transmitting module/mirror assembly and the vehicle seat are forwarded to a vehicle assembly plant (or a third assembly plant). At the vehicle assembly plant, the vehicle seat and the transmitting module/mirror assembly are installed in a vehicle. The receiving module is also associated with the transmitting module at the vehicle assembly plant (box 134).

Figure 10:
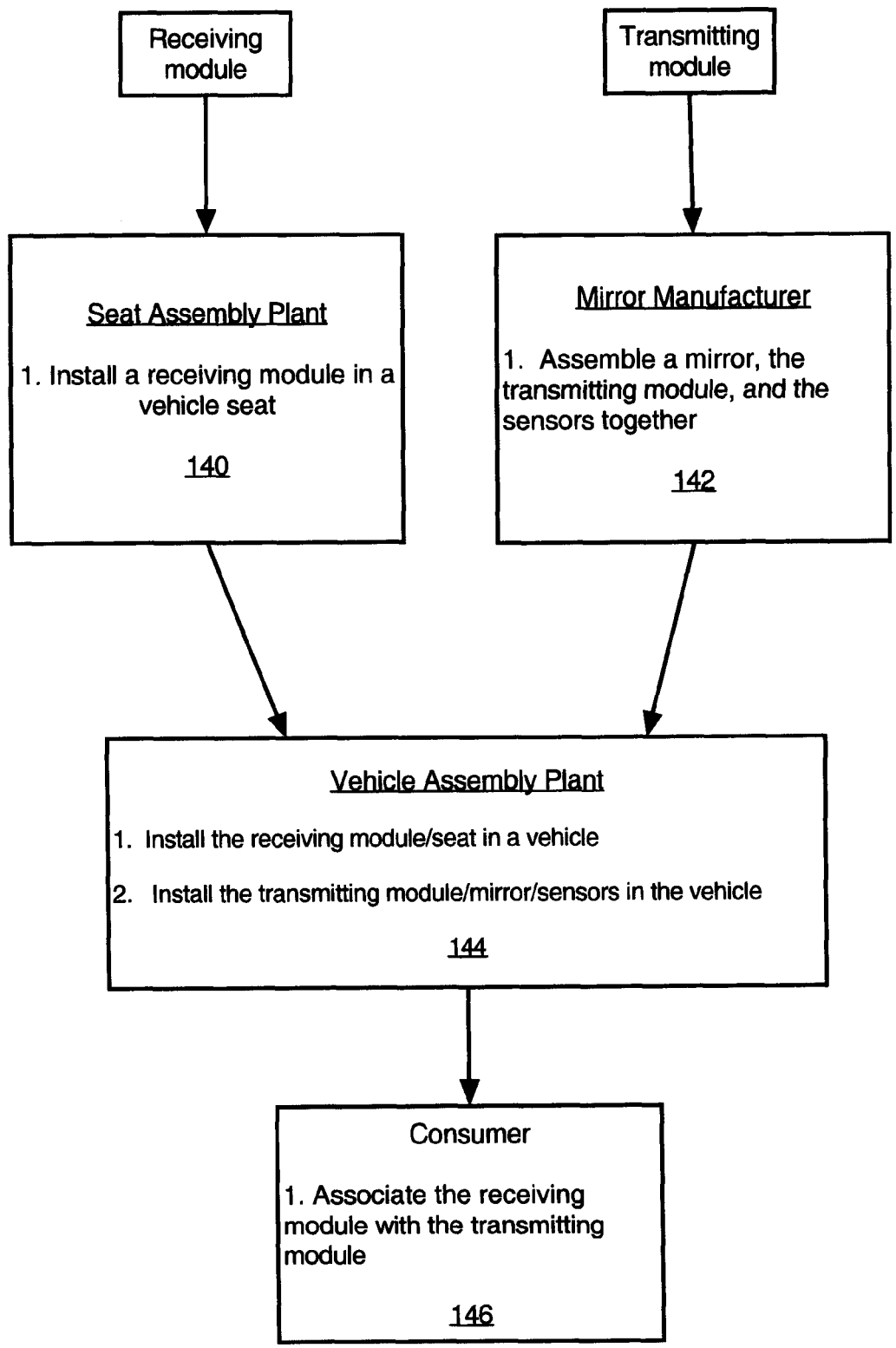
FIG. 10 provides a flowchart of another variation for assembling a remote head restraint actuation system in a vehicle.

FIG. 10 provides a flowchart depicting another variation for installing a remote actuation head restraint system in a vehicle. A receiving module is forwarded to a seat assembly plant (or a first assembly station) at which the receiving module is installed in a vehicle seat (box 140). A transmitting module is forwarded to a mirror manufacturer (or a second assembly station) where the transmitting module is assembled with a mirror to form a transmitting module/mirror assembly (box 142). The transmitting module/mirror assembly and the vehicle seat are forward to a vehicle assembly plant (or a third assembly station). At the vehicle assembly plant, the vehicle seat and the transmitting module/mirror assembly are installed in a vehicle (box 144). In the present variation, the receiving module is associated with the transmitting module by a consumer (box 146).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of matching controller components in a system for remote actuation of at least one vehicle head restraint, the system comprising:

a first head restraint;
a first actuator configured to effect movement of the first head restraint from its raised position to its lowered position;
a rearview mirror;
a first sensor defining a first area proximate to the rearview mirror and configured to output signals to the first actuator to facilitate movement of the first head restraint from its raised position to its lowered position when an object comes within a predetermined distance of the first area, the first sensor being disposed proximate the rearview mirror such that a vehicle operator can simultaneously view the first head restraint in the rearview mirror and the first area,
a transmitting module in communication with the first sensor; and
a receiving module in communication with the first actuator, the method comprising:
a) assembling the rearview mirror and the transmitting module together to form a transmitting module/mirror combination;
b) installing the receiving module in a vehicle;
c) installing a seat in the vehicle;
d) installing the transmitting module/mirror combination; and
e) associating the receiving module with the transmitting module after the receiving module, seat, and transmitting module/mirror combination are installed.

2. The method of claim 1 wherein:
step a) is performed at a mirror manufacture or at a first assembly station.

3. The method of claim 1 wherein:
steps b) and e) are performed at a seat assembly plant or a second assembly station; and
step c) and d) are performed at a vehicle assembly plant or a third assembly station.

4. The method of claim 2 wherein:
step e) is performed at the mirror manufacture or at the first assembly station; and
steps b), c) and d) are performed at a vehicle assembly plant or a third assembly station.

5. The method of claim 2 wherein:
steps b), c), d) and e) are performed at a vehicle assembly plant or a second assembly station.

6. The method of claim 2 wherein:
steps b) and e) are performed at a seat assembly plant or a second assembly station; and
steps c) and d) are performed at a vehicle assembly plant or a third assembly station.

7. The method of claim 2 wherein:
steps b) is performed at a seat assembly plant or a second assembly station; and
steps c) and d) are performed at a vehicle assembly plant or a third assembly station.

8. The method of claim 7 wherein:
step e) is performed at the vehicle assembly plant or the third assembly station.

9. The method of claim 7 wherein:
step e) is performed by a consumer.

* * * * *

UNITED STATES PATENT AND TRADEMARK OFFICE
CERTIFICATE OF CORRECTION

| | | |
|---|---|---|
| PATENT NO. | : 8,600,624 B2 | Page 1 of 1 |
| APPLICATION NO. | : 12/058703 | |
| DATED | : December 3, 2013 | |
| INVENTOR(S) | : Keith E. Mattson et al. | |

It is certified that error appears in the above-identified patent and that said Letters Patent is hereby corrected as shown below:

In the Claims

Column 6, Line 30, Claim 2:

After "at a mirror" delete "manufacture" and
Insert -- manufacturer --.

Column 6, Line 38, Claim 4:

After "at a mirror" delete "manufacture" and
Insert -- manufacturer --.

Signed and Sealed this
Thirteenth Day of May, 2014

Michelle K. Lee
*Deputy Director of the United States Patent and Trademark Office*